March 14, 1933.   C. I. TENNEY   1,900,961
GAS MAKING APPARATUS
Filed May 18, 1925
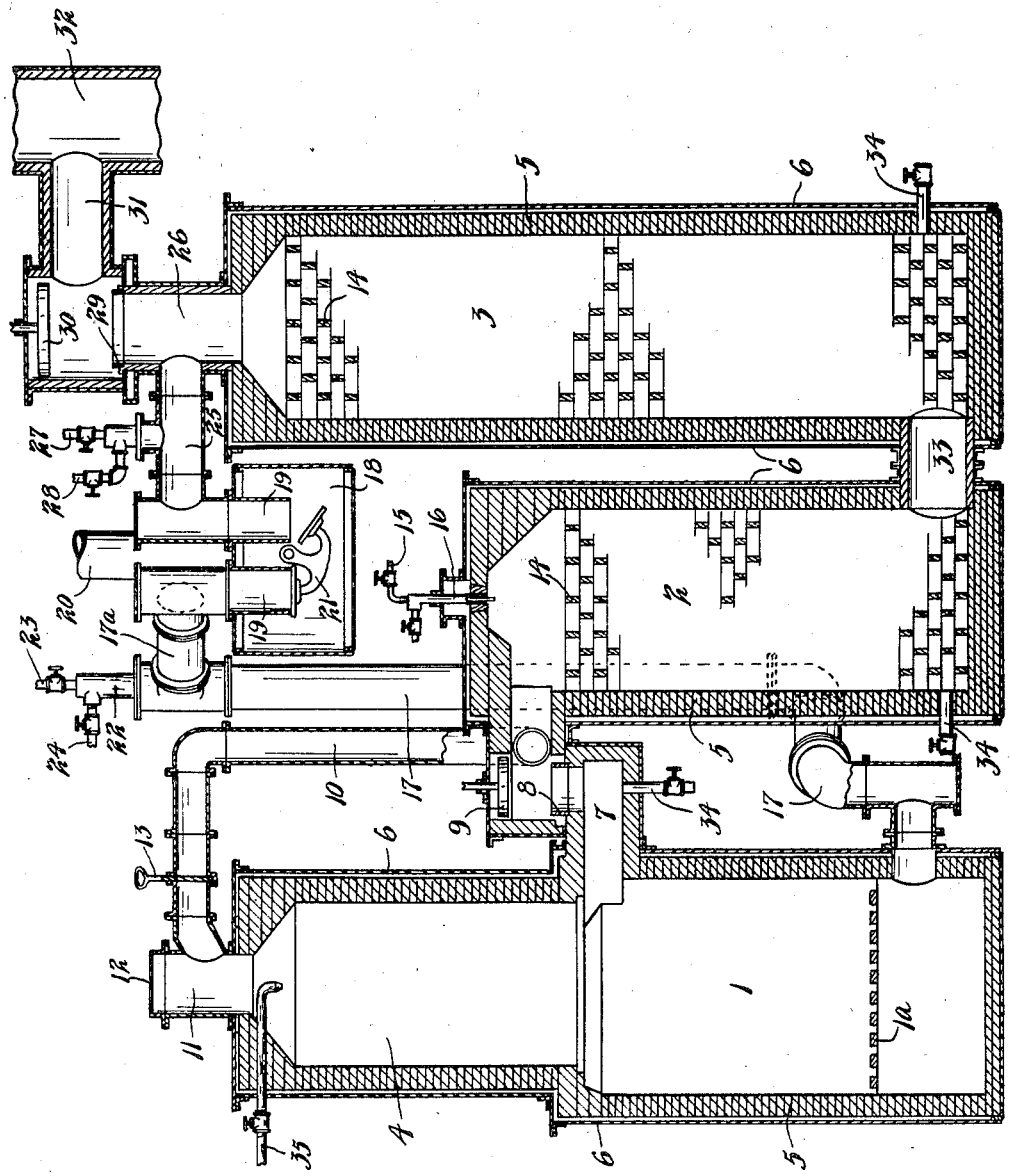
INVENTOR.
C. I. TENNEY.
BY HIS ATTORNEYS.

Patented Mar. 14, 1933

1,900,961

UNITED STATES PATENT OFFICE

CHARLES I. TENNEY, OF NEWTON, IOWA, ASSIGNOR, BY MESNE ASSIGNMENTS, TO SEMET-SOLVAY ENGINEERING CORPORATION, OF NEW YORK, N. Y., A CORPORATION OF NEW YORK

GAS MAKING APPARATUS

Application filed May 18, 1925. Serial No. 31,028.

This invention relates to apparatus for manufacturing artificial illuminating or heating gas. Artificial heating and illuminating gases commonly known in the art as "water gas" and "carbureted water gas" have heretofore been commonly made in an apparatus comprising a generator, carburetor and superheater.

It is an object of this invention to provide apparatus for making an artificial heating or illuminating gas using a generator, carbureter and superheater such as heretofore used, together with an auxiliary fuel chamber or retort.

It is a further object of the invention to provide a gas making apparatus comprising a generator, carburetor, and superheater preferably connected in series, together with an auxiliary fuel chamber above the generator and communicating therewith so that the fuel therein may be heated during a blast run made in the generator, carburetor and superheater, means being provided for reversing the flow through the apparatus, including said auxiliary chamber.

It is also an object of the invention to make an artificial illuminating and heating gas by providing an apparatus including a generator, carbureter and superheater connected in series and an auxiliary fuel chamber or retort communicating with the generator carrying out a blast run through the generator, carburetor and superheater and simultaneously heating to some degree the fuel in the auxiliary chamber, then making a reverse run with air through the superheater, carbureter, auxiliary chamber and generator and passing the resulting gas to storage, and then making a reverse run with steam through the superheater, carbureter, auxiliary chamber and generator and passing the gas to storage, and then making an up run through the generator, retort, carbureter and superheater enriching the gas with oil sprayed into said carbureter and passing the resulting gas to storage.

It is still a further object of the invention to provide an apparatus comprising a generator, carbureter and superheater connected in series with an auxiliary fuel chamber or retort above said generator having a valve between the generator and carbureter, a conduit leading from the top of the carbureter to the top of the auxiliary chamber, and a conduit leading from the bottom of the generator to a seal pot.

It is still another object of the invention to have an apparatus such as set forth in the preceding paragraph, and in addition, having a stack communicating with the top of the superheater, a valve controlling the outlet from the superheater to said stock, and a conduit leading from the top of said superheater to said stack, and a conduit leading from the top of said superheater to said seal pot.

It is also an object of the invention to provide such an apparatus as set forth in the two preceding paragraphs, together with means for directing air or steam into the bottom of the generator or into the top of the superheater.

These and other objects and advantages of the invention will be fully set forth in the following description made in connection with the accompanying drawing in which the different parts are designated by reference characters, and in which, the single view is, for the most part, a vertical section through the apparatus, some parts thereof being shown in side elevation.

Referring to the drawing, a gas generator 1 is shown, as well as a carburetor 2, a superheater 3 and an auxiliary fuel chamber 4. While these various elements may be of any well known and suitable construction, in the embodiment of the invention illustrated, they are shown as comprising vertically disposed cylindrical chambers having walls 5 of fire brick or other refractory material surrounded by suitable casings 6. The generator 1, as usual, has a grate 1a therein and said generator has an open top portion communicating with the lower open end of an auxiliary fuel chamber or retort 4. It will be seen that the diameter of the auxiliary fuel chamber 4 is somewhat less than that of the generator 1. A passage 7 leads from the top of generator 1 to the top of carburetor 2 and a hot valve comprising a ring 8 and a vertically reciprocable plate 9 co-operating therewith is disposed in the passage 7 and adapted to close the same to shut off communication between the generator 1 and the carburetor 2. While any suitable or well known type of hot valve may be used, the one illustrated is of the type shown in the co-pending application of Charles I. Tenney and Paul W. Thayer, filed April 24, 1924, S. N. 708,704. A conduit 10 communicates with the passage 7 on the side of the valve 9 toward the generator 2 and communicates at its other end with a passage 11 leading from the top of the auxiliary chamber 4. The passage 11 is formed by a cylindrical casing extending upwardly from the opening in the top of chamber 4, and is provided with a removable cover 12 which may be moved in any suitable way for the purpose of charging fuel into generator 1 and chamber 4. The conduit 10, preferably, is adapted to be opened and closed by a valve 13 shown as disposed adjacent the passage 11. The carburetor 2 and the superheater 3, as usual, are substantially filled with openwork brick or checker brick 14 and the carburetor 2 has projecting into its top at the central portion thereof, an oil pipe 15 and a steam pipe 16 which will be connected to suitable oil and steam supply, respectively, which pipes are provided with controlling valves. A conduit 17 leads from the bottom of generator 1 below the grate 1a therein preferably upwardly to a seal pot or hydraulic seal 18. The latter is shown as comprising a cylindrical tank having conduits 19 with open lower ends projecting thereinto, and a conduit 20 leads from the top thereof. The lower ends of pipe 19 projects below the surface of a body of water or other liquid maintained in the pot or seal 18 and these ends are adapted ordinarily to be opened and closed by a double swinging valve 21 mounted on a shaft extending at one side of the seal 18. It will be seen that the conduit 17 is connected to one of the pipes 19 by a horizontal portion 17a. A smaller pipe or conduit 22 extends upward from the upper end of conduit 17 to a T connection with which communicates a valve-controlled steam pipe 23 and a valve-controlled air pipe 24. The other pipe 19 is connected by a horizontal pipe or conduit 25 to a passage 26 leading from the top of the superheater 3. The pipe 25 has a connection secured thereto from which extends a valve-controlled steam pipe 27 and a valve controlled air supply pipe 28. At the top of the passage 26 is another hot valve similar to that in the passage 7 and comprising a sharp-edged ring 29 and a reciprocating plate 30 co-operating therewith. A passage 31 is adapted to connect the passage 26 to a stack 32 when the valve comprising parts 29 and 30 is in open position, as shown in the drawing. The lower end of the carburetor 2 is connected to the lower end of the superheater 3 by a passage 33 and auxiliary air supply pipes 34 are shown as communicating with the bottom of the carburetor 2 and the superheater 3, which latter pipes will be valve-controlled. An auxiliary air supply pipe also extends into the passage 7 and this pipe also will be valve-controlled. A valve-equipped pipe 35 extends into the top of chamber 4, through which tar may be run or sprayed into the fuel in said chamber.

In operation, the fuel consisting of bituminous or other coal will be charged into the generator 1 and the auxiliary chamber or retort 4. This fuel will be charged into the generator 1 and chamber 4 through passage 11, cover 12 being removed for this purpose. It will be noted that the chamber 4 is of somewhat smaller diameter than chamber 1 so there will be some space about the top of the chamber 1. After the fuel has thus been charged, the passage 11 is closed by its cover 12, the valve 13 closed, the hot valve 9 is opened and the stack valve 30 is opened. The fuel is now ignited in the usual way and the air blast turned on in the pipe 24. The fuel will be heated and a blast or blow run made by passing air upward through the fuel and generator 1, the resulting gases passing through passage 7 down through the carburetor 2 and up through the superheater 3 to the stack 32. Additional air may also be forced into the passage 7 and into the carbureter and superheater through the pipe 34. When the fuel in the generator 1 has been brought substantially to incandescence and the checker brick in the carbureter 2 and superheater 3 highly heated by the combustion of the gases from the fuel, the air blast will be turned off. During the blast run the fuel in the auxiliary fuel chamber 4 will be heated somewhat by the heat in generator 1 but substantially no volatile matter or products of combustion will be driven off or taken from such fuel owing to the fact that the member 4 is normally closed save for its communication with generator 1. The hot valve 9 will now be closed, valve 13 opened, and the stack valve 30 closed. Valve 21 will also be moved to close pipe 19 communicating with the pipe 25 and open pipe 19 communicating with pipe 17. It may be here stated that the pipes 27 and 28, during the blast run just described, are closed and will remain closed.

After the run just described which is the ordinary blast or blow run, a reverse run is made through the apparatus with air. This air is supplied through the pipe 28 and passes down through the superheater 3 and up through the carbureter 2, and owing to the fact that valve 9 is closed, up through the pipe 10 and down through the chamber 4 and generator 1. From the generator 1 the resulting gas will pass out through pipe 17 to the seal 18. During the blast run the checker brick in the superheater has been very highly heated especially at the upper part thereof. When the reverse run with air is made the air becomes very high heated in passing through the superheater and through the carbureter. The carbon and tar deposited on the checker brick in the superheater or carbureter during the blast run will be burned off by the air in the reverse run. The heated air passes downwardly through the fuel in chamber 4, heating the same, and some combustion will take place in this chamber and carbon monoxide with some carbon dioxide will be formed. The hot air passing through the chamber 4 will also carry off a large amount of hydrocarbons and the resulting gas will pass down through the coke in the generator 1 and out through the pipe 17. By this passage of air the temperature in chamber 4 is greatly raised and the coke in the generator is maintained at high temperature. The operation acts in effect to transfer some of the heat from the highly heated upper end of the superheater to the chamber 4 and the lower part of the generator. The latter is thus kept in a highly heated condition clear to the bottom thereof.

After a reverse run made with air, as described, pipe 28 will be closed and a reverse run will be made with steam through the apparatus, steam being supplied through pipe 27. The steam will pass downwardly through the superheater 3 and upwardly through the carbureter 2, and owing to the fact that the checker brick in the carbureter and superheater are still at a high temperature the steam will be superheated and will pass from the carbureter up through the pipe 10 and down through the fuel in retort 4 and generator 1. The fuel in the chamber or retort 4 has now been brought to quite a high temperature by the reverse run of air, and as the steam passes therethrough and through generator 1, water gas, or carbon monoxide and hydrogen, will be formed. At the same time, this gas will carry off more of the hydrocarbons from the fuel 4 which hydrocarbons will pass down into the hot generator chamber where they will be disassociated and form coke and hydrogen. A lean coal will thus be produced, which coal will be enriched with oil or tar. The reverse run of steam will result in transferring some of the heat from the superheater and carbureter to the fuel in chamber 4 and in the generator 1.

After the reverse steam run above described, the valve 21 will again be moved to open the pipe 19 communicating with pipe 25 and to close the pipe 19 communicating with pipe 17. An up run will now be made through the apparatus by supplying steam to the bottom of the generator from pipe 23 through pipe 17 and this steam will pass upwardly through the hot fuel in generator 1 and in chamber 4 where water gas or carbon monoxide and hydrogen will be formed and some hydrocarbon will be distilled from the uncarbonized fuel. This gas will pass from chamber 4 downwardly through pipe 10, downwardly through the carbureter 2 and upwardly through the superheater 3. The carbureter 2 and the superheater 3 are still at sufficiently high temperature to efficiently fix this gas and the gas will be enriched with oil sprayed through the pipe 16. The gas will pass from superheater 3 through pipe 25 and pipe 19 into the seal 18 and will be conducted to storage in the usual manner. A very short purging run with air will now be made by turning air into the pipe 17 through pipe 24, which air will pass upwardly through generator 1 and through chamber 4 downwardly through pipe 10 and carbureter 2 and upwardly through the superheater 3, the gas formed during this short run passing into the seal through pipe 25 and pipe 19 communicating therewith. After this cycle of operations the valve 13 will now be closed, hot valve 9 opened and stack valve 30 opened, valve 21 also being swung to close pipe 19 communicating with pipe 25. Another blast or blow run will now be made by blowing air up through the generator 1, which air will be supplied by pipe 24 through pipe 17. The blast run will be made as before up through the generator through valve 8, downwardly through the carbureter and upwardly through the superheater 3 to the stack 32, the chamber 4 being by-passed during this run, as in the previous blast run. During the successive runs the fuel in chamber 4 will gradually be coked and will pass downwardly into the generator 1. Any tar which may be supplied through pipe 35 for enriching the gas in the reverse steam or air runs will be decomposed and the hydrocarbons thereof will be carried off with the gas while the carbon residue will become coked with the coal in chamber 4 and will pass down into generator 1. The fuel charged into chamber 4 it will be noted, in accordance with this invention, is efficiently used in the manufacture of the gas. Practically all of the calorific value in the fuel is transferred to the resulting gas formed and a great saving will be effected by the use of the low grade fuel in supplying the hydrocarbon and carbon to the gas. The coking of the fuel is done in the generator chamber 1. The generator is at all times full of the proper coked fuel for making water gas and this fuel feeds down into the generator from retort chamber 4. In the prior methods where gas is discharged directly into the generator, with intermittent charging, the capacity of the apparatus is limited and large quantities of $CO_2$ are developed as a result of the unequal depth of the fuel in the generator and blow holes caused by massing of the fuel, particularly during the blast run in heating the generator. Furthermore, a large portion of the volatile constituents of the fuel are carried off with the blast gases. In applicant's process there is no passage of the blast gases through the retort chamber, consequently the volatile portion of the coal is saved for the enriching of the water gas. The reverse run of air burns off the deposit on the checkerbrick in the carbureter and superheater. The reverse run of steam acts to cool off the superheater and carbureter and prevent the overheating of the checkerbrick. This heat is taken up by the steam which is thus superheated and a transfer of the heat is made to the other end of the apparatus.

Instead of carrying out the cycle of runs above described, good results may also be obtained by making the runs in slightly different order. After the first blast run, through the generator, carbureter and superheater, the valves 9, 13, 29 and 30 may be closed, valve 21 being left in the position shown in the drawing. The up run may then be made by passing steam upwardly through the generator 1, which steam will be supplied from pipe 23 through pipe 17. This steam will pass upwardly through the generator and through the fuel in chamber 4 and will then pass downwardly through pipe 10, carbureter 2 and upwardly through superheater 3 and then through pipes 25 and 19 to the seal from which it will be lead, as usual, to a suitable scrubbing and storing apparatus. The steam entering the hot coked fuel in the generator will be dissociated and water gas, or carbon monoxide and hydrogen will be formed, which gas will be at a high temperature. The fuel in chamber 4, particularly that in the lower part of the chamber, has already been somewhat heated and this fuel will be still more highly heated by the hot CO and hydrogen passing therethrough. This hot water gas will, in passing through the chamber 4, carry off a large quantity of hydrocarbons from said fuel and said gas will thus be enriched. The coking process will now be begun. The gas will be fixed as usual, in the carbureter 2 and superheater 3. After this gas making up run, the valve 21 will be swung to close the pipe 19 communicating with pipe 25 and open the pipe 19 communicating with pipe 17. A reverse run of steam will now be made, the steam being supplied through pipe 27. This steam will pass downwardly through superheater 3 and will be highly superheated therein. The steam will pass upwardly through carbureter 2 and through pipe 10 and then downwardly through the heated fuel in chamber 4 and the heated fuel in carbureter 1. Water gas will be formed in chambers 4 and 1 and the gas will be enriched with hydrocarbons taken from the comparatively green fuel or fresh coal in chamber 4. The resulting gas will pass out at the bottom of the generator through pipe 17 and will pass upwardly therein and to the seal 18 from whence it will be conducted as usual to suitable cleaning or scrubbing apparatus and to storage. After the reverse steam run, a reverse air run will then be made, air being supplied through pipe 28, which air will pass downwardly through superheater 3 upwardly through carbureter 2 and through pipe 10. This air will be highly heated in the superheater and carbureter and will pass downwardly through the fuel in retort 4 and in generator 1. Any carbon or tar which has been deposited on the checker brick in carbureter 2 and superheater 3 will be effectively burned and cleaned therefrom by the passage of air, this combustion resulting in the formation of carbon monoxide and some carbon dioxide. These gases with the heated air pass, as stated, downwardly through chamber 4 and some combustion will take place in this chamber. The resulting gas will consist principally of carbon monoxide and nitrogen. There will also be a considerable amount of hydrocarbons taken from the fuel in chamber 4, so that the gas is enriched. The gas passing down through the fuel in generator 1 will be heated and fixed and the resulting gas will pass out through pipe 17 and upwardly to the seal 18, as before. If necessary, the gas formed during the reverse runs, particularly the reverse run of steam, may be enriched by tar supplied through the pipe 35. This may be necessary after the operations have been carried on for several hours and the hydrocarbons from the green fuel or fresh coal in chamber 4 largely used up and said fuel largely coked. After the reverse air run through the apparatus, the valve 13 will again be closed and valves 9 and 30 opened. Valve 21 will be again swung to close the pipe 19 communicating with pipe 25. The apparatus will then be ready for another blast run. If desired, a short purging run with air will be carried out by passing air upwardly through the generator 1, chamber 4 and onward through the apparatus before changing the valves for the blast run. With the cycle of runs last described, the fuel in the bottom of the generator 1 will be cooled by the first gas making up run and this fuel will again be somewhat re-heated in the reverse runs.

From the above description it is seen that applicant has provided a simple and efficient apparatus for making artificial illuminating or heating gas. As set forth, a great saving in fuel is effected, both in the cost of the fuel used for coking purposes and the fuel used for enriching the gas. By the reverse run of air the checker brick and the superheater and carbureter are very effectively cleaned. By the use of the chamber 4 and the arrangement of the runs therethrough, as described, the gas is discharged to the seal in a comparatively cool condition. In the ordinary use of the three shell machine the gas passes through the highly heated fuel in the generator and the highly heated checker brick of the carbureter and superheater. The upper part of the superheater is usually heated to a very high degree and it will thus be seen that the gas leaving the superheater will be at a very high temperature. This high temperature of the gas is objectionable as wasteful of the heat. The gas made in the reverse runs will cool off the superheater and the carbureter to some extent and leave the bottom of the generator in a comparatively cool condition. When the gas making up run is performed, the checker brick in the carbureter and superheater are reduced somewhat in temperature, particularly that at the top of the superheater so that the gas also leaves the superheater in comparatively cool condition.

Existing installations of gas making apparatus may be modified to embody this invention by merely adding the auxiliary fuel chamber or retort 4 to the top of the generator and making the proper connections. The additional expense of the apparatus is small when the great saving in fuel is considered.

It will, of course, be understood that various changes may be made in the form, details, arrangement and proportions of the apparatus without departing from the scope of applicant's invention, which, generally stated, consists in such apparatus capable of carrying out the objects above stated, in the novel parts and combinations of parts disclosed and defined in the appended claims.

What is claimed is:

1. A water gas plant including a single generator, a single superheater, and a washbox, a gas line leading directly from said generator to said washbox, and by-passing the superheater, a gas line leading directly from said superheater to said washbox, and a single valve for alternately opening one of said lines and substantially simultaneously closing the other.

2. A water gas plant including a single generator, a single carburetor, and a single superheater connected in series, a washbox, a gas line leading from said generator to said washbox and by-passing said carburetor and superheater, a gas line leading directly from said superheater to said washbox, and a single valve for alternately opening one of said lines and substantially simultaneously closing the other.

3. A carburetted water gas making apparatus in combination, a generator, a substantially unobstructed fuel-receiving chamber disposed over and communicating with said generator so as to feed fuel thereto, a gas passage leading from the top of said generator, a carburetor with which said passage communicates, means for closing said passage, a superheater in series with said carburetor, a conduit leading from said carburetor to the top of said chamber, means for closing said conduit, means for directing air into said superheater and successively back through the said carburetor, conduit, chamber and generator for generating gas, a gas line leading from the base of said generator and by-passing the carburetor and superheater, a second gas line leading from the superheater, and valve mechanism for alternately opening one of said lines and substantially simultaneously closing the other.

4. A carburetted water gas making apparatus having in combination, a generator, a substantially unobstructed fuel-receiving chamber disposed over and communicating with said generator so as to feed fuel thereto, a gas passage leading from the top of said generator, a carburetor with which said passage communicates, means for closing said passage, a superheater in series with said carburetor, a conduit leading from said carburetor to the top of said chamber, means for closing said conduit, means for directing steam into said superheater and successively back through said carburetor, conduit, chamber and generator for generating gas, a gas line leading from the base of said generator and by-passing the carburetor and superheater, a second gas line leading from the superheater, and valve mechanism for alternately opening one of said lines and substantially simultaneously closing the other.

5. A water gas plant including a single generator, a fuel-receiving chamber communicably connected with said generator, a single superheater, a gas line leading directly from said generator and by-passing the superheater, a gas line leading directly from said superheater, valve mechanism for alternately opening one of said lines and substantially simultaneously closing the other, means for passing air through said generator, passing the resultant blast gases through the superheater to heat the same, means for passing air in a reverse direction through the heated superheater into and through the fuel in said chamber, means for passing the resultant gas through the fuel in said generator, and means for withdrawing the resultant gas from said generator.

6. A carburetted water gas plant including a single generator, a fuel receiving chamber communicably connected with said generator, a single carburetor, and a single superheater connected in series, a washbox, a gas line leading from said generator to said washbox and by-passing said carburetor and superheater, a gas line leading directly from said superheater to said washbox, valve mechanism for alternately opening one of said lines and substantially simultaneously closing the other, means for passing air through said generator, passing the resultant blast gases through the superheater to heat the same, means for passing air in a reverse direction through the heated superheater, carburetor, and into and through the fuel in said chamber, means for passing the resultant gas from the chamber through the fuel in said generator, and means for withdrawing the resultant gas from said generator.

7. A water gas plant including a single generator, a fuel-receiving chamber communicably connected with said generator, a single superheater, a gas line leading directly from said generator and by-passing the superheater, a gas line leading directly from said superheater, a valve for alternately opening one of said lines and substantially simultaneously closing the other, means for passing air through said generator, passing the resultant blast gases through the superheater to heat the same, means for passing steam in a reverse direction through the heated superheater into and through the fuel in said chamber, means for passing the resultant gas from the chamber through the fuel in said generator, and means for withdrawing the resultant gas from said generator.

8. A carburetted water gas plant including a single generator, a fuel-receiving chamber communicably connected with said generator, a single carburetor, and a single superheater connected in series, a washbox, a gas line leading from said generator to said washbox, valve mechanism for alternately opening one of said lines and substantially simultaneously closing the other, means for passing air through said generator, passing the resultant blast gases through the carburetor and superheater to heat the same, means for passing steam in a reverse direction through the heated superheater and carburetor into and through the fuel in said chamber, means for passing the resultant gas from said chamber through the fuel in said generator, and means for withdrawing the resultant gas from said generator.

9. A water gas plant including a single generator, a fuel-receiving chamber communicably connected with said generator, a single superheater, a gas line leading directly from said generator and by-passing the superheater, a gas line leading directly from said superheater, valve mechanism for alternately opening one of said lines and substantially simultaneously closing the other, means for passing air through the fuel in said generator and passing the resultant blast gases through the superheater to heat the same, means for passing steam through the fuel in said generator up through the fuel in said chamber, passing the resultant water gas into and through the superheater, means for passing steam in a reverse direction through the superheater into and through the fuel in said chamber and said generator, and means for withdrawing the resultant gas from said generator.

10. A water gas plant including a single generator, a single superheater, and a gas line leading directly from said generator and by-passing the superheater, a gas line leading directly from said superheater, valve mechanism for alternately opening one of said lines and substantially simultaneously closing the other, means for passing air through said generator and passing the resultant blast gases through the superheater to heat the same, means for passing air in a reverse direction through the heated superheater, into and through the fuel in said generator, and means for withdrawing the resultant gas from said generator.

11. A carburetted water gas plant including a single generator, a single carburetor, and a single superheater connected in series, a gas line leading from said generator and by-passing said carburetor and superheater, a gas line leading from said superheater, valve mechanism for alternately opening one of said lines and substantially simultaneously closing the other, means for passing air through said generator and passing the resultant blast gases through the carburetor and superheater to heat the same, means for passing air in a reverse direction through the heated superheater and carburetor, into and through the fuel bed in said generator, and means for withdrawing the resultant gas from said generator.

12. A water gas plant including a single generator and a single superheater, a gas line leading directly from said generator and by-passing the superheater, a gas line leading directly from said superheater, and valve mechanism for alternately opening one of said lines and substantially simultaneously closing the other.

13. A water gas plant including a single generator and a single superheater, a gas line leading directly from said generator and by-passing the superheater, a gas line leading directly from said superheater, valve mechanism for alternately opening one of said lines and substantially simultaneously closing the other, means for passing air through the generator and passing the resultant blast gases through the superheater to heat the same, means for passing steam in a reverse direction through the heated superheater into and through the fuel bed in said generator, and means for withdrawing the resultant gas from said generator.

14. A water gas plant including a single generator having a fuel bed therein, a single superheater, a gas line leading directly from said generator and by-passing the superheater, a gas line leading directly from said superheater, valve mechanism for alternately opening one of said lines and substantially simultaneously closing the other, means for passing air through the fuel in said generator and passing the resultant blast gases through the superheater to heat the same, means for passing steam in a reverse direction through the superheater into the generator, means for adding hydrocarbon enriching material to said steam, means for passing the resultant mixture of steam and hydrocarbon enriching material through the fuel bed in said generator, and means for withdrawing the resultant gas from said generator.

15. A water gas plant including a single generator having a bed of fuel therein, a single carburetor, and a single superheater connected in series, a gas line leading from said generator and by-passing said carburetor and superheater, a gas line leading directly from said superheater, valve mechanism for alternately opening one of said lines and substantially simultaneously closing the other, means for passing air through the fuel bed in said generator and passing the resultant blast gases through the carburetor and superheater to heat the same, and means for passing steam in a reverse direction through the heated superheater, carburetor, and into said generator, means for adding a hydrocarbon enriching material to said steam, means for passing the resultant mixture of steam and hydrocarbon enriching material through the fuel bed in said generator, and means for withdrawing the resultant gas from said generator.

16. A water gas plant including a single generator, a single carburetor, and a single superheater connected in series, a gas line leading from said generator and by-passing said carburetor and superheater, and a gas line leading from said superheater, and valve mechanism for alternately opening one of said lines and substantially simultaneously closing the other.

In testimony whereof I affix my signature.

CHARLES I. TENNEY.